Dec. 14, 1965 D. L. THOMAS 3,223,507
METHOD OF HEAT TREATING GLASS SHEETS
Filed June 17, 1964 6 Sheets-Sheet 1

INVENTOR.
DEAN L. THOMAS
BY
Chisholm and Spencer
ATTORNEYS

Dec. 14, 1965     D. L. THOMAS     3,223,507
METHOD OF HEAT TREATING GLASS SHEETS

Filed June 17, 1964     6 Sheets-Sheet 2

INVENTOR.
DEAN L. THOMAS
BY Chisholm and Spencer
ATTORNEYS

Dec. 14, 1965   D. L. THOMAS   3,223,507
METHOD OF HEAT TREATING GLASS SHEETS
Filed June 17, 1964   6 Sheets-Sheet 3

INVENTOR.
DEAN L. THOMAS
BY Chisholm and Spencer
ATTORNEYS

Dec. 14, 1965  D. L. THOMAS  3,223,507
METHOD OF HEAT TREATING GLASS SHEETS
Filed June 17, 1964  6 Sheets-Sheet 4

INVENTOR.
DEAN L. THOMAS
BY Chisholm and Spencer
ATTORNEYS

Dec. 14, 1965   D. L. THOMAS   3,223,507
METHOD OF HEAT TREATING GLASS SHEETS
Filed June 17, 1964   6 Sheets-Sheet 5

INVENTOR.
DEAN L. THOMAS
BY Chisholm and Spencer
ATTORNEYS

Dec. 14, 1965  D. L. THOMAS  3,223,507
METHOD OF HEAT TREATING GLASS SHEETS
Filed June 17, 1964  6 Sheets-Sheet 6

INVENTOR.
DEAN L. THOMAS
BY
ATTORNEYS

United States Patent Office 3,223,507
Patented Dec. 14, 1965

3,223,507
METHOD OF HEAT TREATING GLASS SHEETS
Dean L. Thomas, Crestline, Ohio, assignor to Pittsburgh Plate Glass Company, Pittsburgh, Pa., a corporation of Pennsylvania
Filed June 17, 1964, Ser. No. 375,877
11 Claims. (Cl. 65—114)

This invention relates to the fabrication of glass and more particularly to the tempering or the bending and tempering of sheets of glass while supporting and conveying the sheets of glass upon a flow of gas.

Glass sheets to be tempered or to be bent and tempered may advantageously be supported and conveyed upon a flow of gas while the glass sheets are heated to a deformation temperature suitable for bending and tempering. For most plate and window glass the deformation temperature, that is, the temperature at which the major surfaces or the contour thereof will be changed by a deforming stress or contact with solids, is around 980 degrees Fahrenheit and above.

Glass sheets supported and conveyed upon a flow of gas may be conveniently heated by supplying radiant heat from above and by heating the supporting flow of gas to the temperature desired of the sheets. After a glass sheet is heated to a deformation temperature suitable for bending and tempering, it is supported and quenched between opposing flows of cooler ambient air to rapidly lower the temperature of the sheet through the annealing range of the glass to temper the sheet.

From the standpoint of maximizing the throughput of glass sheets in such a process, it is advantageous to provide sufficient heat at high temperatures above and below the glass to raise the temperature of the glass to a suitable bending and/or tempering temperature quickly enough to allow relatively high conveying speeds and relatively short processing lines. Because of the uniform support afforded by a gas support, glass may be heated at greater rates and to higher temperatures than in conventional tong or roller processes without risk of unacceptable deformation from the supporting elements. In accordance with the present invention, an improved tempered or bent and tempered glass product, produced by supporting and conveying a generally horizontally disposed glass sheet on a flow of heated gas while supplying heat from above to rapidly heat the glass to a deformation temperature, may be obtained by lowering the temperature of the supporting gas and the heat source above the glass immediately prior to (i.e., directly in advance of) the flow of quenching air that is impinged upon the heated sheet to temper it. By lowering the temperature of the supporting gas and upper heat source, distortion of the glass sheets that frequently occurs during quenching, particularly due to impingement of cooling fluid upon sheets that have been heated to relatively high surface temperatures in an attempt to raise the internal temperature to the required level at a rapid rate, is minimized or eliminated.

Briefly, the present invention most advantageously utilizes a gas support bed as disclosed herein (and disclosed in more detail in assignee's published Republic of South Africa patent application No. 62/3935, hereby incorporated herein by reference) to support and convey the glass during processing. The gas support bed includes a heating section and a quenching section. In the heating section, gas heated to a deformation temperature of the glass is emittted from the gas support bed to support and heat the glass from below. Heat is also supplied from above the glass, as by radiant heaters positioned above and along the gas support bed, to assure a balanced and relatively uniform heating of the sheets. Each glass sheet is conveyed along the bed by edge contact with the peripheries of rotating discs or with other suitable mechanisms, such as an endless belt or chain. To facilitate conveying glass sheets by such mechanisms, the gas support bed is tipped sidewise of the direction of glass movement at a slight angle to bias the supported sheets against the conveying mechanism, which is located along the lower longitudinal edge of the gas support bed. The gas support bed may be flat along its entire length or may change from flat to curved along the length if a change in the shape of the conveyed, heat softened sheets is desired prior to tempering.

In the heating section of the gas support bed, the glass sheets are rapidly heated to a temperature suitable for bending and tempering. This is facilitated by establishing a relatively high temperature of the supporting gas and the heat source above the glass in the first and major portion of the heating section. In accordance with the present invention, in the final portion of the heating section, directly in advance of the quenching section, the temperature of the supporting gas and the heaters above the sheets is reduced to lower the surface temperature of each sheet prior to subjecting the heat softened sheet to the impingement of cooling air in the immediately subsequent quenching section. Each glass sheet is then moved to the quenching section and rapidly cooled (i.e., tempered) between upper and lower beds of gas outlets that emit flows of cooler ambient air.

The attendant advantages of this invention and the various embodiments thereof will be readily appreciated as the same become better understood by reference to the following detailed description when considered in connection with the accompanying drawings in which.

Figure 1:
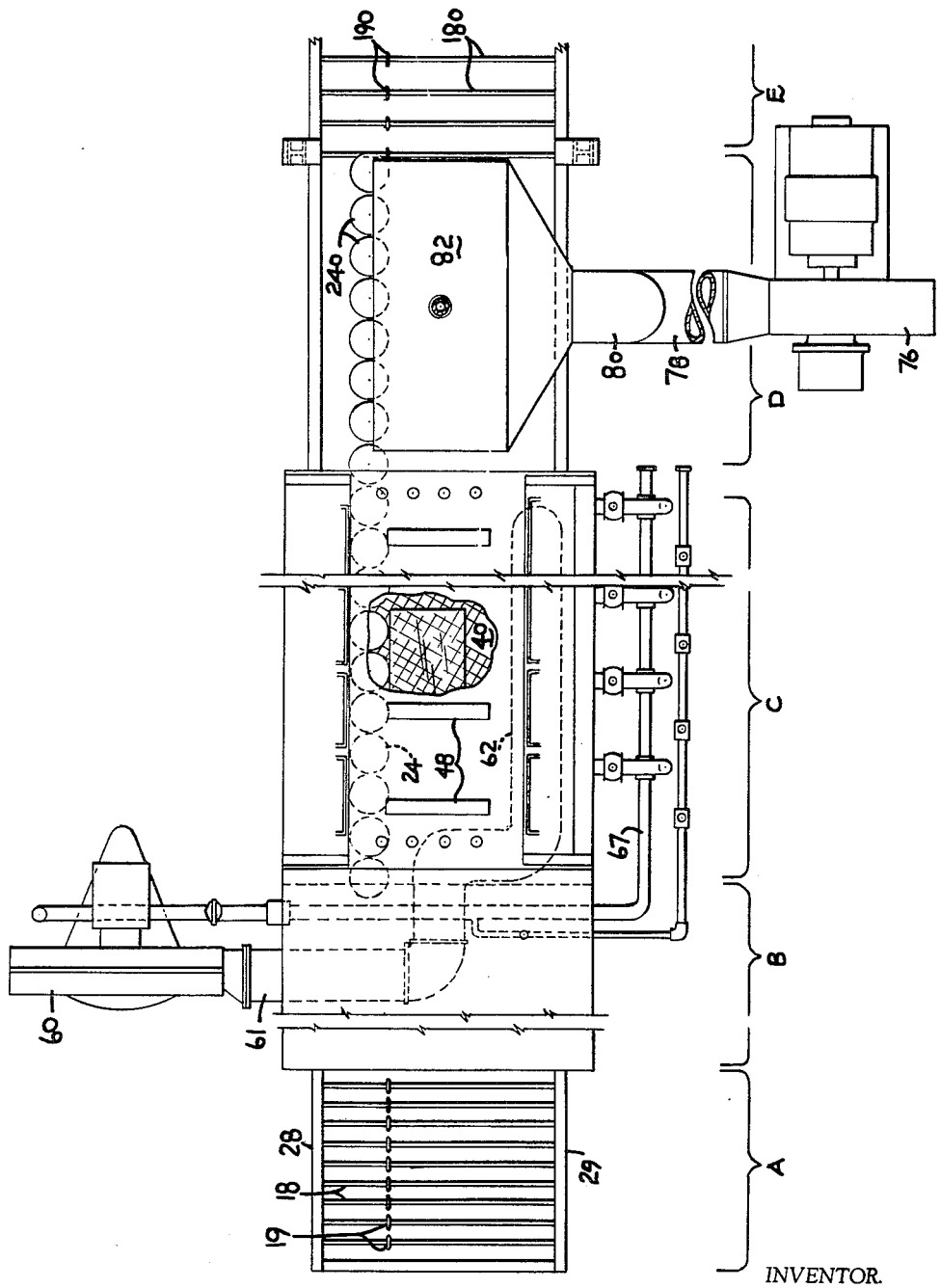
FIG. 1 is a plan view of a system for conveying, heating and quenching sheets of glass in accordance with the present invention.
Figure 2:
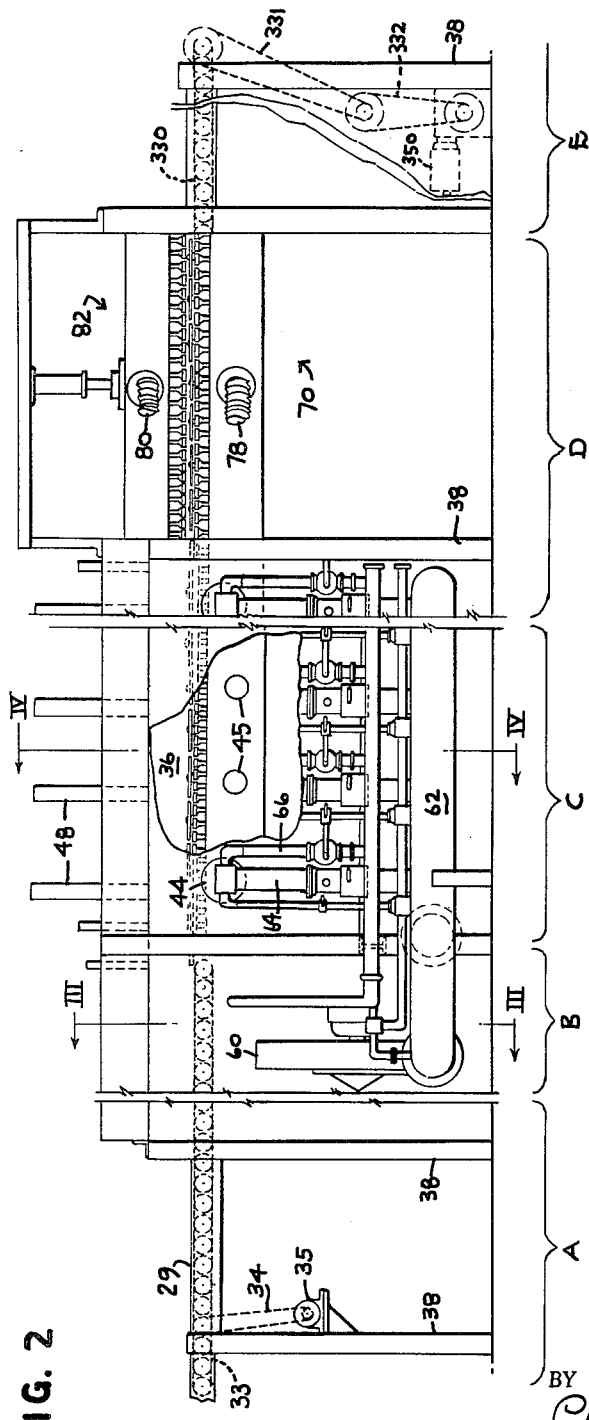
FIG. 2 is a side elevational view of the system of FIG. 1.

Referring to the drawings, FIGS. 1 and 2 diagrammatically illustrate a system advantageously employed for heating flat glass parts to a deformation temperature, e.g., to a temperature at which the glass will deform to a supporting force and can be tempered, quenching such parts while hot and delivering the parts thus tempered onto a roll conveyor for removal. The component sections making up the complete system consists of a loading section A where the glass is placed on rolls 18 and conveyed into the furnace, a preheat section B wherein the glass is conveyed on rolls 20 (FIG. 3) between radiant heaters 22 and 23 above and below the glass to preheat the glass until brought to a suitable preheat temperature lower than the deformation temperature; a gas film support heating section C where the glass parts are transferred to, and supported on, a flow of hot gas while being conveyed through a frictional drive such as drive wheels 24 contacting the edges only of such parts, supplemental heat being supplied by radiant heat sources 25 above and, optionally, 26 below the glass (FIG. 4) until the glass reaches a temperature high enough for bending and tempering purposes; a quenching section D where the glass is rapidly chilled while suspended between opposed flowing films of cool air, edge contact driving being continued through the section by drive wheels 240; and a delivery roll system E, which receives the tempered glass parts from the quenching system and conveys them to their next destination.

Figure 3:
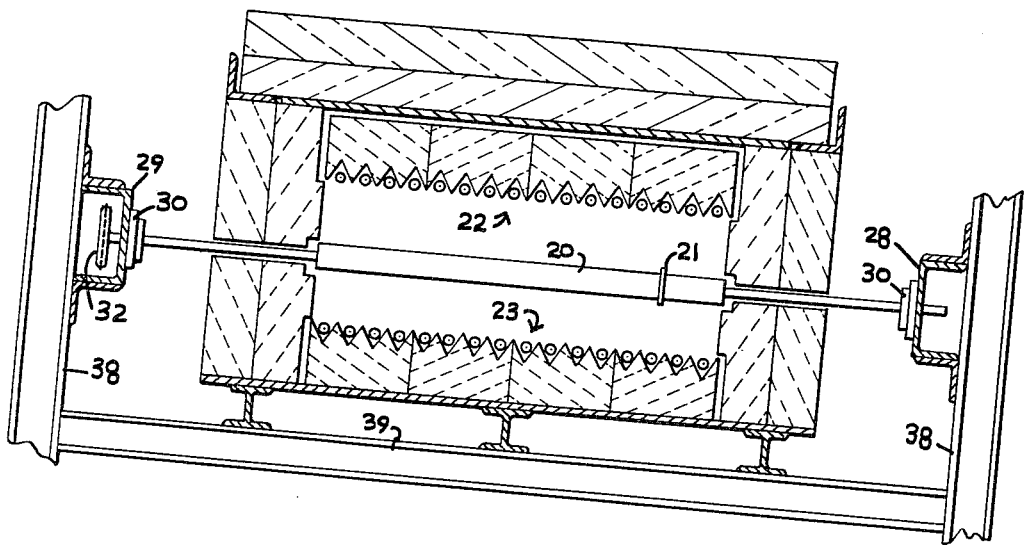
FIG. 3 is a detailed view partly in section, taken along the line III—III of FIG. 2.

As shown in FIGS. 1 to 3, loading section A and preheat section B include longitudinally extending horizontal channels 28 and 29 that support bearings 30 in which are journaled loading rolls 18 and conveying rolls 20. Rolls 18 and 20 are provided with guide collars 19 and 21, respectively, in alignment throughout the sections A and B so as to position the glass properly for transfer to the gas support next following. Each roll is driven through gears 32 by chains 33 and 34 energized by drive motor 35.

Figure 4:
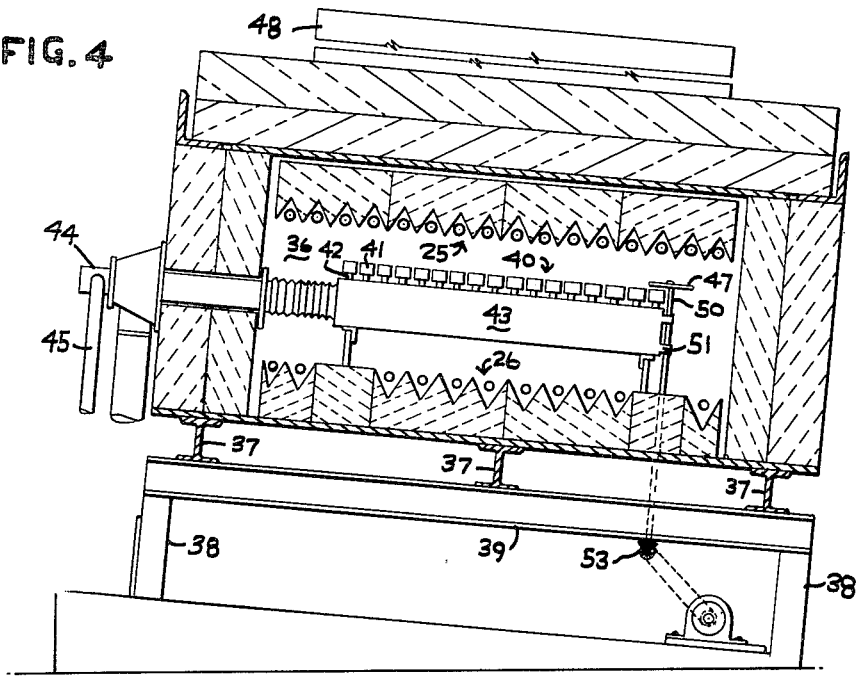
FIG. 4 is a detailed view, partly in section, taken along the line IV—IV of FIG. 2.

Referring to FIGS. 1, 2 and 4, the gas film support heating section C includes a supporting framework that consists essentially of girders 37, stanchions 38 and cross beams 39. Located within the supporting framework is a furnace chamber 36 of insulated refractory walls.

Figure 6:
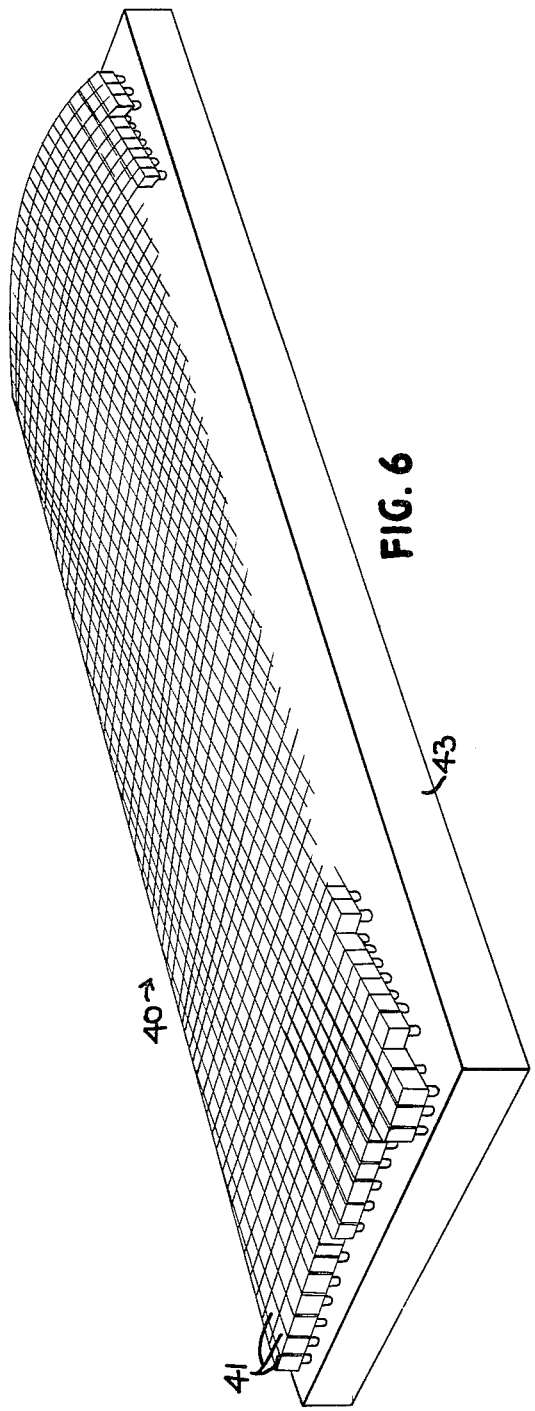
FIG. 6 is a diagrammatic perspective view showing a gas film support bed, the generative surface of which progressively changes in contour from flat to a cylindrical shape in a cross section normal to the longitudinal axis of the bed.
Figure 7:
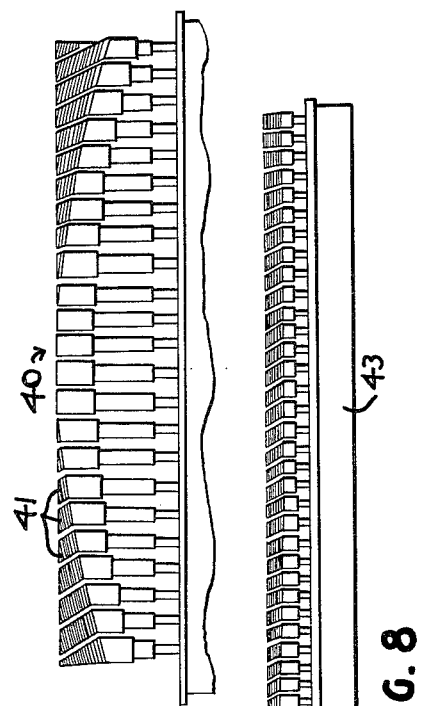
FIG. 7 is an end elevation view of the bed of FIG. 6 looking toward the part of maximum curvature.
Figure 8:
FIG. 8 is a side elevation of the bed of FIG. 6 showing how the curve is developed along the path of travel of the glass.

Within furnace chamber 36 is a flat bed 40 of modules 41 in spaced but close juxtaposition each to the other and a arranged geometrically like a mosaic. In the embodiment illustrated, all modules 41 have their upper termini of rectangular configuration and defining a common flat surface. Optionally, the surface may be modified to change from flat to curved in the direction of glass travel, as shown in FIGS. 6 to 8. The modules 41 are arranged in successive rows crossing the intended path of travel of the workpiece, each row being at an angle other than 90 degrees from the path and spaced close to the next adjacent row.

Each module 41 has a stem 42 of smaller cross sectional area than the upper terminus and each opens into one of a plurality of successively aligned and juxtaposed plenum chambers 43 positioned below the bed 40 and acting as a support therefor. See FIGS. 4 and 5. Each module is substantially enclosed and separated from other modules by a space that provides an exhaust zone. The bed is adjusted to such level that the plane of the upper termini of the modules lies parallel to, but just below by approximately the height of the gap between the modules and the support height of the glass sheet, the plane defined by the upper surfaces of the conveying rolls 20 of the preheat section. At one side, the plenum chambers 43 are in communication with a plurality of gas burners 44 through orifices 45 (FIG. 2) and flexible couplings 46 (FIG. 4). The gas support bed is tilted in a sidewise direction at an angle of approximately 5 degrees with respect to the horizon, as shown in FIG. 4. At the lower side of bed 40 a series of uniform disc-like driving members 24 extend inwardly and just above the bed to frictionally engage one edge only of the workpiece and convey it along the bed in continuous straight line travel. A plurality of vents 48 project through the roof of furnace chamber 36 to exhaust the interior to the atmosphere. Driving members 24 are mounted on shafts 50, journals 51 for which are supported by the supports for the plenum chambers. Each shaft 50 is driven by motor-driven drive shaft 53. Radiant heat is supplied above the support bed 40 by radiant roof 25 and, optionally, below the bed by radiant floor 26.

To supply air under pressure to the hot gas support combustion system, a blower 60 feeds air under pressure through a conduit 61 to a manifold 62 and thence to gas burners 44 via conduits 64. Gas is introduced into burners 44 through conduits 66, from a main 67. Each burner 44 is of the so-called direct-fired, air-heater type. The combustion of the products in the combustion chamber produces sufficient plenum pressure to supply the modules with heated gas of uniform temperature and pressure. The supply of fuel gas may be varied to change the heat input and the supply of air may be varied to change the pressure in the plenum.

FIGS. 6 to 8 show a transitional portion of module bed 40 for use in bending glass while it is supported on a flow of gas. The heights of the modules 41 from the plenum chamber 43 are selectively and progressively changed, both in the direction of glass travel and in a direction transversely thereto, by reducing the depths of the module cavities in varying degrees to gradually change the surface defined by the upper termini of the modules from flat to curved. Because each module supports an overlying portion of the glass at a uniform distance from its terminus, the deformable glass will bend as it progresses, conforming to the shape of the bed.

Next adjacent the gas support heating section C in the direction of travel of the workpiece is quenching section D. See FIGS. 1, 2 and 9. The quenching section D includes a lower bed of modules 70 arranged in mosaic pattern similar to that of the gas film support heating bed. Each module 71 has a stem 72 smaller in cross section than the upper terminus and projecting through a cooling box 73 into a plenum 74, the cooling box and upper surface of the plenum acting as a support for the modules. The surface of the upper termini of the modules is adjusted to such level that it lies at the same level and in the same contour as that of the end portion of the gas film heating bed next preceding.

Above the bed 70 and supported in such fashion as to be capable of being raised and lowered, is a head assembly 82 which, in essence, constitutes a mirror image of complementary contour of the bed 70 and its associated heat exchange box 73 and plenum chamber 74. The upper and lower heat exchange boxes and plenum chambers are supplied separately with heat exchange fluid and air in like manner. Relatively cool gas, such as air at ambient temperature, is supplied to upper and lower plenum chambers by a blower 76 via ducts 78 and 80. The air is supplied at a suitable rate of flow and pressure to support the glass sheets between the opposing flows of cool air and to rapidly cool the glass. Heat exchange fluid, such as cooling water, is introduced into the cooling boxes 73 and discharged therefrom through inlets and outlets (not shown) to maintain the beds at a substantially uniform temperature throughout. The upper and lower quench beds, while shown flat in FIGS. 2 and 9, will be curved to match the final shape of the support bed of heating section C where glass is to be bent using a module bed contoured as in FIGS. 6 to 8.

Rotating drive disc 240 along the lower side of the quench section extend between upper and lower quenching beds to frictionally engage one edge only of the workpiece and convey it along the bed in continuous straight line travel in the manner previously described in connection with the heating section. If desired, the last few drive members 24 of the heating section and the drive members 240 of the quenching section may be driven at a higher than normal conveying speed to rapidly transfer sheets of glass from heating section C to quenching section D. After adequate time for transfer, the speed is then reduced to the normal conveying speed.

As shown in FIGS. 1 and 2, the delivery roll section E consists of conveyor rolls 180 provided with guide collars 190 in alignment with discs 240 of the quenching section to maintain the proper position of the glass during transfer therefrom. Each roll is suitably journalled in bearings and is driven by chain 330 via power chains 331 and 332, by drive motor 350.

Figure 5:
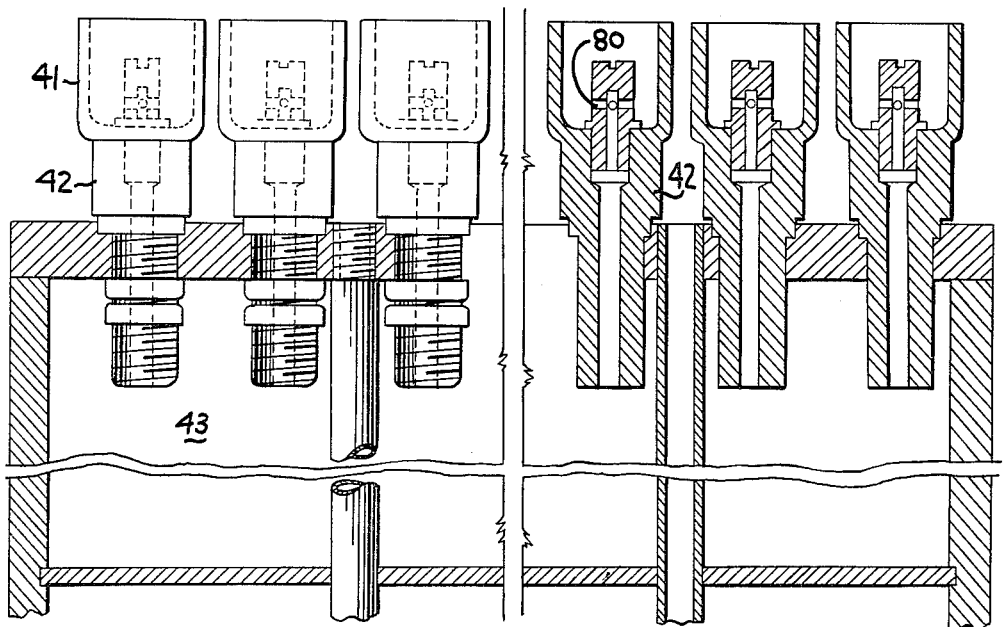
FIG. 5 is a partial section view of the support bed showing the relationship of support chambers or modules to a supporting plenum chamber.

Modules 41 forming the support bed 40 are shown in detail in FIG. 5. Each module 41 forms an open-top chamber. The upper terminus of each module defines a zone of substantially uniform pressure beneath the overlying glass. Pressure is exerted by gas supplied to each module 41 from the supporting plenum chamber 43 by way of the hollow supporting stem 42 and a plurality of orifices 80 communicating between each module cavity and the hollow stem 42. Orifices 80 are disposed to prevent direct impingement of pressurized gaseous fluid against the supported glass surface and to assure that the gas introduced into each cavity diffuses into gas already present, thus assuring uniform pressure across the upper edges of the module. Additionally, orifices 80 provide a drop in gas pressure from the interior of the plenum to the interior of the modue.

Figure 11:
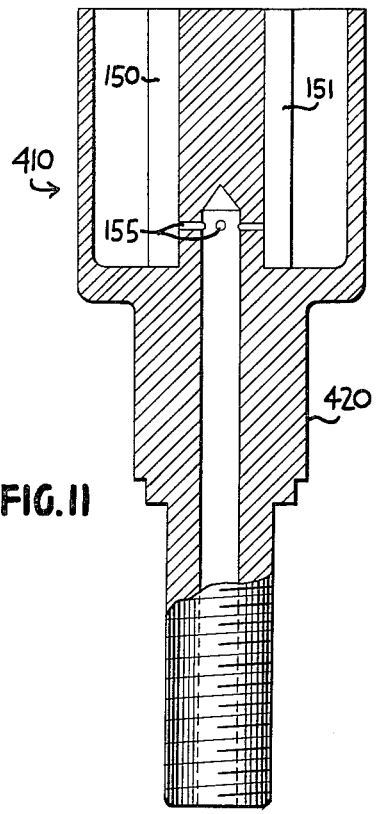
FIG. 11 is a section taken along the line XI—XI of FIG. 10.
Figure 10:
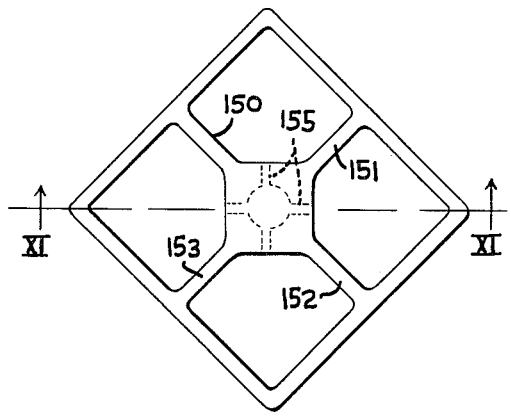
FIG. 10 is a plan view of an improved support module unit in which the support area is subdivided by partitions.

An alternative embodiment of a module 410 is shown in FIGS. 10 and 11. This module is similar to module 41 but is subdivided into four independent subchambers by walls 150, 151, 152 and 153. Separate orifices 155 communicate between a hollow stem 420 and each subchamber of the module so that each subchamber functions independently of the others. In this manner, support is provided when any one subchamber is covered with glass.

Figure 9:
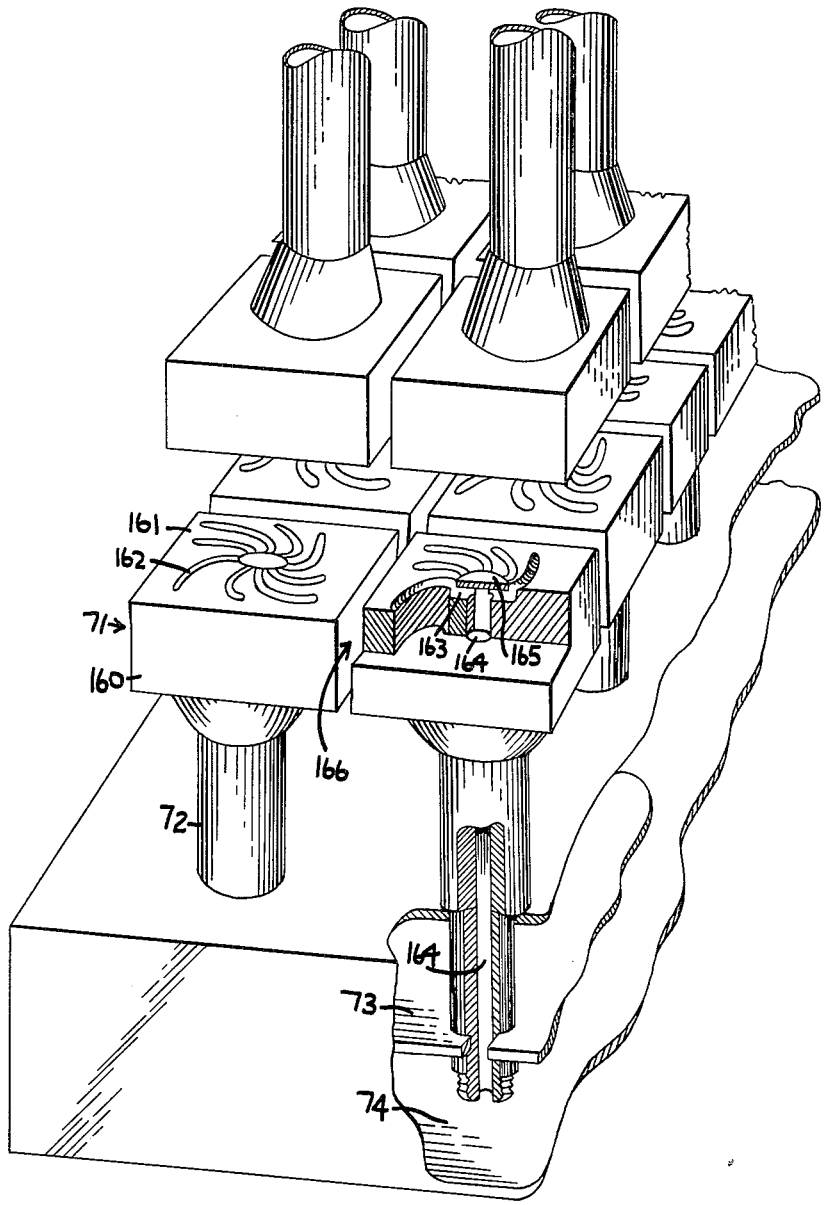
FIG. 9 is a partial, perspective view of an upper and lower quench bed including the lower supporting plenum chamber and showing the construction of the quench modules.

Quench module 71 is shown in more detail in FIG. 9. Each module 71 includes a prismatic body portion 160 having an end surface or, in the position of the lower modules shown in FIG. 9, an upper surface 161 of generally rectangular configuration and containing a plurality of coplanar, arcuate grooves 162 extending outward from a central part of the module at which location each groove communicates through a radial portion 163 with a central passageway 164 extending through the stem 82 and communicating with the plenum chamber 84. A fixed cap member 165 cooperates with radial groove portions 163 and central passageway 164 to form a restricted orifice for each groove 162. With this arrangement, gas from the plenum is fed under pressure to the centermost portion of each arcuate subdivision of the module and flows along the grooves 162 while escaping over the walls thereof and across the upper surface 161 of the module 81 to exhaust zones 166 surrounding each individual module. When the module is in close proximity to a sheet of material, the pressure of the gas within the grooves 162 and adjacent the surface 161 exerts a force against the sheet capable of supporting the same. With this arrangement an extremely high rate of heat transfer and an accurate control of the rate of heat transfer between the adjacent sheet of material and the flowing gas is obtained. That is, the rate of heat transfer may be readily varied in a controlled manner by adjustments in gas flow and/or spacing between the modules and the glass.

OPERATION

The following is an example, by way of illustration only, of a preferred mode of operation of the invention disclosed herein as applied to the treatment of glass sheets:

Flat sheets of glass $3/16$ inch nominal thickness and approximately 15 inches wide by 25 inches long are placed lengthwise seriatim upon the rolls 18 of preheat section A, properly aligned by guide collars 19 and conveyed to the preheat section A and then on the rolls 20 into and through the preheat section at a line speed of approximately 240 inches per minute. Electric heating coils 22 above and 23 below the moving glass supply heat to the preheat section at a sufficient rate to raise the temperature of the glass to approximately 950 degrees Fahrenheit surface temperature in approximately 30 feet of glass travel.

As the leading edge of the glass sheet leaves the last roll of the preheat section and progressively covers modules 41 forming support bed 40, the sheet becomes partly and finally fully supported by the uniform pressure of the gas emitted from the modules. The magnitude of this gas pressure is never large, and in any event, is held low enough and uniform enough from module to module so that it does not cause bowing or other deformation of the glass. Once the glass becomes gas supported, it is conveyed by edge contact through frictional engagement of its lower edge with rotating drive members 24. For this purpose, the entire system is positioned in a common plane tilted at an angle of 5 degrees with respect to the horizon to provide the glass with a component of force normal to the driving discs.

Gas burners 44 are supplied natural gas and air in proportions by volume of approximately 1 to 36, respectively, which includes 260 percent excess air over that required to provide complete combustion. The natural gas is provided at a rate of approximately 60 cubic feet per hour per square foot of bed. The products of combustion are introduced to the plenum chambers, producing therein a pressure of approximately 0.5 pound per square inch gauge. Each module includes orifices that reduce this pressure in the module cavities that are covered with glass to about $1/21$ of the plenum pressure. Gas is introduced to the stem of each module at temperatures of between about 1150 and 1250 degrees Fahrenheit and a volume flow of approximately 1.3 cubic feet per minute.

The module bed of this example is constructed of 120 modules per square foot of the type shown in FIG. 5 and the upper terminus of each module forms a square, the outer sides of which are 1 inch long, the spacings between the walls of adjacent modules being $3/32$ of an inch. Each wall is $1/16$ inch thick.

The module bed is formed first flat and then, as illustrated in FIGS. 6 to 8, to present a gradually changing plane of support from one that is initially flat to one that is convex and cylindrically curved about an axis parallel to the direction of travel. The radius of curvature of the curved portion of the bed is 60 inches. The change in contour from flat to curved begins approximately 156 inches from the beginning of the heating section where the glass has attained a temperature level of about 1,200 degrees Fahrenheit and is sufficiently deformable to readily follow the gradually changing contour of the module bed at the speed at which the glass is conveyed.

The nominal module support pressure when covered by the $3/16$ inch thick glass is 0.017 pound per square inch above that existing above the glass, which provides a nominal spacing of approximately 0.010 inch between the underside of the gas film supported glass and the upper terminus of the module walls. The nominal exhaust pressure is substantially one atmosphere absolute.

To heat the glass, the supporting gas is held at a temperature above that of the glass during the initial heating stage until the glass has reached a temperature suitable for bending and tempering. In this example, the glass sheets are supported and conveyed through heating section C toward quenching section D upon a module bed for a distance of 36 feet. In the first 12 feet the bed is flat and in the next 6 feet the bed gradually changes from flat to curved. The temperature of the supporting gas in the first 18 feet of the bed is maintained at about 1250 degrees Fahrenheit. The last 18 feet of bed are cylindrically curved in the final shape desired in the glass. The temperature of the supporting gas in this portion of the bed is reduced to about 1150 degrees Fahrenheit.

Heat is also radiantly applied to the glass from above the gas support bed. The temperature of the source is maintained at about 1400 degrees Fahrenheit during the first 18 feet of the bed in the direction of glass travel through heating section C toward quenching section D, 1300 degrees Fahrenheit along the next 12 feet, and 1240 degrees Fahrenheit along the last 6 feet. In this manner, the temperature of the glass is first raised to about 1220 degrees Fahrenheit with the surface temperature somewhat higher, and the surface temperature is then lowered to about 1180 degrees Fahrenheit prior to quenching.

As the leading edge of a glass sheet approaches the end of the heating section a sensing element in module bed 40 actuates a time-operated control that causes the last three discs 24 of the heating section and all discs 240 of the quenching section to rotate at a higher speed to rapidly convey the heated sheet from the heating section to the quenching section at a rate of approximately 10 inches per second. After transfer, the control device causes the drive discs to revert to the normal conveying speed.

In the quenching section the upper and lower module beds extend a distance of 10 feet in the direction of glass travel and are curved transversely of the path of travel in the same manner as the terminal portion of the heating section and of matching curvature (i.e., with a radius of curvature of 60 inches). Water is circulated through cooling boxes 83 at a flow rate of 1 gallon per minute per square foot of bed, the inlet temperature of the water being about 60 degrees Fahrenheit and the outlet temperature being about 80 degrees Fahrenheit. Each quench module bed of this example is formed of square modules having a surface area of approximately 2 square inches and of the type shown in FIG. 12, but having curved facing surfaces to match the contour of the glass. An exhaust gap between the adjacent modules of approximately 3/16 of an inch is provided. Air at ambient temperature of about 140 degrees Fahrenheit is supplied independently to the upper and lower plenum chambers to provide plenum pressures of about 18 and 7 ounces per square inch gauge, respectively. Each module includes orifices that reduce this pressure to about 1/8 of the plenum pressure as the air escapes into the module cavities. The air is emitted from upper and lower module beds at rates of about 2.2 and 1.6 standard cubic feet per minute per square inch of glass surface area being quenched, respectively. The gap between lower and upper module beds is about 0.30 inch and the glass sheet is supported approximately 0.020 inch above the lower bed.

The glass is quenched for approximately 15 seconds to lower the temperature of the glass below the annealing range and to prevent the sheet from reheating from residual internal heat. At the end of the tempering operation the glass sheet is no longer deformable through viscous flow of the glass and is conveyed from the air support of the quenching system to the rolls of the delivery system by discs 240 and onto rolls 180.

Sheets of glass treated in the above manner have a resultant stress, in terms of the center tension thereof as indicated by the birefringent effect of the glass on polarized light rays, of approximately 3300 millimicrons per inch of glass length, as measured by standard retardation techniques.

Decreasing the temperature of the supporting gas and top heat of the furnace chamber immediately in advance of the quenching operation provides a glass sheet hot enough to be tempered and yet not so hot at the surfaces as to be easily deformed by the impinging flow of cooling gas used to temper the sheet in the quenching section. One specific result of such decrease in temperature is the reduction or elimination of surface deformation in the form of lines on the surface of the sheet extending longitudinally of the sheet in the direction of glass travel, the lines previously having been caused by the impingement of cooling air from the quenching modules upon the major surfaces of the glass sheet being tempered. By way of example, severe lines appearing when glass at a surface temperature of 1220 to 1240 degrees Fahrenheit is tempered are greatly reduced when the surface temperature of the glass is reduced to 1180 degrees Fahrenheit prior to quenching.

VARIATIONS AND OTHER EMBODIMENTS

While the apparatus and operating example disclosed above illustrate a preferred embodiment of this invention, it will be understood that other apparatus may be utilized to practice the inventive concept herein disclosed and that the specific operating steps may be varied without departing from the inventive concept.

It will be apparent that other forms of apparatus for supporting and conveying sheets of glass on a gas or other fluid may be used in lieu of the particular embodiment disclosed, which utilizes modules. For example, a porous bed or other form of perforated support plate may be used as long as the glass is uniformly supported while heated to a temperature suitable for bending and/or tempering. In addition, the top heat, particularly in the preheat section and initial portion of the heating section, will in many instances be supplied by heated gas emitted through slots, or by radiant burners supported above the glass in lieu of electric coils.

The present invention, of course, is equally applicable to the processing of flat glass that is to be tempered only rather than bent and tempered. In either instance, economic utilization of the furnace dictates the use of supporting gas and top heaters at higher temperatures than the temperature to which the glass must ultimately be heated, in order to assure a rapid transfer of heat. As a result, the surfaces of the glass sheets are heated to a higher temperature than is necessary or desirable for quenching. In both instances the surface distortion resulting during quenching is diminished or eliminated by reducing the temperature of the supporting gas and top heat just prior to quenching.

While in the disclosed example, the temperature of the supporting gas is reduced from 1250 to 1150 degrees Fahrenheit and the top heat from 1400 to 1240 degrees Fahrenheit, the specific temperatures and the amount of the reduction in temperature may, of course, be varied. For example, the temperature of the supporting gas may be lowered to 1100 degrees Fahrenheit and the top heat to 1180–1200 degrees Fahrenheit, particularly where glass is being tempered only rather than bent and tempered. It is believed, however, for tempering purposes, that the temperature of the supporting gas just prior to the tempering section should be maintained at least as high as 1050 degrees Fahrenheit and the top heat at least as high as 1150 degrees Fahrenheit. On the other hand, to avoid distortion of the glass in the quench, the temperature of the supporting gas just prior to the tempering section should be reduced to at least as low as 1200 degrees Fahrenheit and the top heat should be lowered to at least 1300 degrees Fahrenheit and preferably the temperatures should be lower. Obviously, the initial temperature of the support gas and top heat may vary from that specifically disclosed and, as it varies, the magnitude of the decrease in temperature to prevent distortion in accordance with this invention will also vary, inasmuch as the distortion caused by tempering is a function of the final temperature of the glass. Nevertheless, it is contemplated in this invention that initial heating temperatures of the supporting gas and top heaters will be at least 50 degrees higher than final heating temperatures directly in advance of the tempering section in order to rapidly heat the glass in as short a distance as practical. Thus, the glass can be rapidly heated and yet be introduced into the tempering section at a low enough temperature to avoid unacceptable deformation. From the above it will be evident that the initial heating will utilize support gas at a temperature of at least as high as 1100 degrees Fahrenheit and top heat at a temperature at least as high as 1200 degrees Fahrenheit. It is also contemplated that the glass sheets will be exposed to the reduced temperature prior to quenching for a period time of at least 5 seconds and more often 10 or more seconds, but generally no longer than 60 seconds.

One particular type of distortion substantially reduced or eliminated by the present invention is the formation of lines in the surfaces of quenched sheets, which lines extend along the sheet in the direction of glass travel. The lines are believed to represent mechanical displacement of the glass at the surfaces of the sheet due to the flow of cooling air and accompanying contraction of the glass, and are of an order of magnitude of tenths or hundredths of a thousandth of an inch in depth. These lines, if present, may be observed by casting a shadowgraph of the glass sheet in the manner specified in American Standard Safety Code, Z26.1–1950, Safety Code for Safety Glazing Materials for Glazing Motor Vehicles Operating on Land Highways, section 5.15.2.2 Visibility Distortion, published by American Standards Association Incorporated. It will be understood that other types of distortion, such as gross distortion of the glass sheet being tempered due to non-uniform pressures from the flow of quenching fluid will also be minimized or eliminated by the present invention.

It should be evident from the above section that while in the foregoing disclosure certain preferred embodiments of the invention have been disclosed, numerous modifications or alterations may be made therein without departing from the spirit and scope of the invention as set forth in the appended claims.

What is claimed is:

1. In a method of tempering a sheet of glass, the steps comprising supplying a continuous flow of gas along a predetermined path, supporting the sheet of glass upon said flow of gas and moving the so supported sheet along the predetermined path, maintaining the temperature of the gas along a first portion of the path in the direction of glass travel at a temperature of at least 1100 degrees Fahrenheit, supplying heat from above the glass along a first portion of the path at a temperature of at least 1200 degrees Fahrenheit, maintaining the temperature of the gas along a subsequent portion of the path relative to the direction of glass travel at a temperature at least 50 degrees Fahrenheit lower than the temperature of the gas supplied along said first portion of the path, supplying heat from above the glass along the subsequent portion of the path at a temperature at least 50 degrees Fahrenheit lower than the temperature at which heat is supplied along said first portion of the path until distortion of the glass which ordinarily occurs during the tempering of said glass after the heating thereof in said first portion of said path is substantially reduced, while maintaining the temperature of the glass high enough to ensure tempering thereof during a subsequent quench, and then quenching the sheet of glass between opposing flows of gas.

2. The method of claim 1 wherein the sheet of glass is supported and moved along said subsequent portion of the path at which the temperature of the supporting gas and heat from above is at least 50 degrees Fahrenheit lower than along the first portion of the path for a period of time between 5 and 60 seconds.

3. In a method of tempering sheets of glass by heating the sheets to a deformation temperature and then quenching the sheets, the steps comprising supporting a sheet of glass upon a flow of gas at a temperature of at least 1100 degrees Fahrenheit and supplying heat from above the supported sheet at a temperature of at least 1200 degrees Fahrenheit; thereafter, and immediately prior to quenching the sheet of glass, reducing the temperature of the supporting gas and the heat supplied from above the supported sheet by at least 50 degrees Fahrenheit for a period of at least 5 seconds, while maintaining the temperature of the glass high enough to ensure tempering thereof during a subsequent quench, and then quenching the sheet by rapidly cooling the sheet in flows of air that are cooler than the sheet.

4. In a method of heating and tempering glass wherein the glass is disposed over a hot gas support and is heated to a deformation temperature and thereafter quenched to temper it while applying support gas at said temperature to the underside thereof tending to create distortion in said glass during quenching, the improvement which comprises first heating the glass higher than the minimum deformation temperature necessary for tempering, and then, prior to quenching and while the glass is at a deformation temperature, applying to the underside thereof a gas which is at a deformation temperature lower than the temperature of the gas applied during said heating and above said minimum deformation temperature until distortion of the glass which ordinarily occurs during the tempering of said glass after said first heating thereof is substantially reduced, and then quenching the glass while it is hot enough to temper it.

5. The method of claim 4 including reducing the temperature at which heat is supplied from above from a temperature of about 1400 degrees Fahrenheit to a temperature of about 1240 degrees Fahrenheit and reducing the temperature of the gas from a temperature of about 1250 degrees Fahrenheit to a temperature of about 1150 degrees Fahrenheit directly in advance of the quench section.

6. In a method of tempering a sheet of glass, the steps comprising: providing a gas support bed including a hot section for heating sheets of glass and a quench section for cooling the sheets of glass after they have been heated; supporting a sheet of glass on a flow of gas above said support bed; moving the sheet along the support bed through the hot section to the quench; supplying heat above the support bed from a source at a temperature at least as high as 1200 degrees Fahrenheit and flowing hot gas through the support bed at a temperature at least as high as 1100 degrees Fahrenheit along an initial portion of the support bed to heat the sheet of glass to a deformation temperature; and reducing the temperature of the heat source above the support bed by at least 50 degrees Fahrenheit and to a temperature at least as low as 1300 degrees Fahrenheit, and reducing the temperature of the supporting gas by at least 50 degrees Fahrenheit and to a temperature at least as low as 1200 degrees Fahrenheit, but high enough to ensure tempering of the glass during a subsequent quench, in a subsequent portion of the hot section directly in advance of the quench section until distortion of the glass sheet which ordinarily occurs during the tempering of said glass sheet after the heating thereof in said initial portion of the support bed is substantially reduced.

7. The method of claim 6 wherein the sheet of glass is subjected to the reduced temperature for at least 5 seconds.

8. In a method of tempering a sheet of glass, the steps comprising heating the sheet to a deformation temperature suitable for subsequent tempering by applying heat to the sheet at temperatures higher than the minimum deformation temperature necessary for tempering the sheet, then applying heat to the sheet at a substantially lower temperature above said minimum deformation temperature until distortion of the glass sheet which ordinarily occurs during the tempering of said glass sheet after said first heating thereof is substantially reduced, while maintaining the temperature of the sheet high enough for tempering and tempering the sheet directly thereafter.

9. The method of claim 8 wherein the heat applied at a lower temperature is applied at a temperature at least 50 degrees Fahrenheit lower than the prior applied heat.

10. In a method of tempering a sheet of glass, the steps comprising heating the sheet to a deformation temperature higher than necessary for tempering, thereafter reducing the surface temperature of the sheet while maintaining the temperature of the sheet high enough for tempering until distortion of the glass sheet which ordinarily occurs during the tempering of said glass sheet after said heating at said higher temperature is substantially reduced, and then rapidly cooling the sheet to temper the same.

11. In a method of tempering glass in which the glass is at least partially supported while it is at a deformation temperature and is thereafter quenched, the improvement which comprises first heating the glass to a temperature higher than the minimum deformation temperature required for tempering; and, immediately prior to tempering, heating the surfaces of said glass at a lower temperature while maintaining the temperature of the glass above the minimum deformation temperature for tempering until distortion of the glass which ordinarily occurs during the tempering of said glass after said first heating thereof is substantially reduced, and then quenching the glass.

References Cited by the Examiner
UNITED STATES PATENTS

| | | | |
|---|---|---|---|
| 2,042,610 | 6/1936 | Littleton | 65—114 |
| 2,826,868 | 3/1958 | Wynne et al. | 65—374 X |

DONALL H. SYLVESTER, *Primary Examiner.*

A. D. KELLOGG, *Assistant Examiner.*